(12) United States Patent
Rowell et al.

(10) Patent No.: US 10,142,038 B1
(45) Date of Patent: Nov. 27, 2018

(54) MIMO SIGNAL GENERATOR WITH FREQUENCY MULTIPLEXING

(71) Applicant: Rohde & Schwarz GmbH & Co. KG, Munich (DE)

(72) Inventors: Corbett Rowell, Munich (DE); Vincent Abadie, Hohenschaeftlarn (DE); Werner Kehlenbach, Dorfen (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/675,087

(22) Filed: Aug. 11, 2017

(51) Int. Cl.
*H04B 17/12* (2015.01)
*H04B 7/0413* (2017.01)
*H04J 1/08* (2006.01)

(52) U.S. Cl.
CPC ........... *H04B 17/12* (2015.01); *H04B 7/0413* (2013.01); *H04J 1/08* (2013.01)

(58) Field of Classification Search
CPC .............................. H04B 17/12; H04B 7/0413
See application file for complete search history.

(56) References Cited

U.S. PATENT DOCUMENTS

| 8,576,947 | B2 | 11/2013 | Olgaard et al. | |
| 2008/0084951 | A1* | 4/2008 | Chen | H04B 7/04 375/347 |
| 2015/0304146 | A1* | 10/2015 | Yang | H04L 5/0066 370/329 |
| 2016/0135190 | A1* | 5/2016 | Takaoka | H04L 5/0041 370/329 |
| 2017/0187477 | A1 | 6/2017 | Ko et al. | |
| 2017/0373773 | A1* | 12/2017 | Jing | H04B 17/318 |

* cited by examiner

*Primary Examiner* — Kabir A Timory
(74) *Attorney, Agent, or Firm* — Ditthavong & Steiner, P.C.

(57) ABSTRACT

A MIMO signal generator is adapted to generate a MIMO signal is provided. The MIMO signal generator comprises a signal generator, a signal divider and a frequency shifter. The signal generator is adapted to generate a plurality of frequency shifted partial MIMO signals within a first signal generator output signal. The frequency shifted partial MIMO signals being arranged on the frequency axis in a non-overlapping manner. The signal divider is adapted to divide the first signal generator output signal into a plurality of signal paths. The frequency shifter preferably comprises a frequency shifting device in at least one of the plurality of signal paths. The frequency shifting devices are adapted to shift the frequencies of the plurality of frequency shifted partial MIMO signals to a joint carrier frequency, resulting in a plurality of partial MIMO signals, forming the MIMO signal.

16 Claims, 5 Drawing Sheets

MIMO SIGNAL GENERATOR WITH FREQUENCY MULTIPLEXING

TECHNICAL FIELD

The invention relates to a signal generator for generating MIMO signals, a measuring system comprising such a signal generator and a measuring method.

BACKGROUND ART

During recent years, more and more MIMO devices are being used. A MIMO signal consists of a number of individual partial MIMO signals in the same frequency range with the same carrier frequency, emitted by different antennas in order to achieve spatial diversity.

In order to generate a MIMO signal, conventionally a completely separate signal generator is used for each MIMO signal. Especially in a measuring setup, this requires a great deal of individual measurement devices. For example, US 2017/0187477 A1 shows such a MIMO device.

Accordingly, one object of the invention among others is to provide a MIMO signal generator, measuring system and measuring method, which allow for generating a MIMO signal with a minimum number of components.

SUMMARY OF THE INVENTION

According to a first aspect of the invention, a MIMO signal generator adapted to generate a MIMO signal, is provided. The MIMO signal generator comprises a signal generator, a signal divider and a frequency shifter. The signal generator is adapted to generate a plurality of frequency shifted partial MIMO signals within a first signal generator output signal, the frequency shifted partial MIMO signals being arranged on the frequency axis in a non-overlapping manner. The signal divider is adapted to divide the first signal generator output signal onto a plurality of signal paths.

The frequency shifter preferably comprises a frequency shifting device in at least each but one of the plurality of signal paths. The frequency shifting devices are adapted to shift the frequencies of the plurality of frequency shifted partial MIMO signals to a joint carrier frequency, resulting in a plurality of partial MIMO signals, forming the MIMO signal. It is thereby possible to generate the MIMO signal using only a single signal generator.

According to a preferred implementation form of the first aspect, the signal generator is adapted to arrange the plurality of frequency shifted partial MIMO signals on the frequency axis in a non-overlapping manner, by placing carrier frequencies of at least all but one the plurality of frequency shifted partial MIMO signals at different frequencies. A simple generating of the signal generator output signal is thereby assured.

According to a further preferred implementation form of the first aspect, the different frequencies are spaced apart at least by a bandwidth of the MIMO signal. An overlap is thereby efficiently prevented.

According to a further preferred implementation form of the first implementation form of the first aspect, the different frequencies are spaced apart at least by 110% of a bandwidth of the MIMO signal, preferably by 120% of the bandwidth of the MIMO signal. An overlap is thereby especially thoroughly prevented.

According to a further preferred implementation form of the first aspect, each of the signal paths additionally comprises an antenna for transmitting the partial MIMO signal of the respective signal path over the air. This allows for performing over the air measurements on a device under test.

According to a further preferred implementation form of the first aspect, at least one, preferably each, of the signal paths additionally comprises a first filter arranged between the signal divider and the frequency shifting device, adapted to remove signal components outside of a frequency shifted bandwidth of the signal path. This removes undesired signal components.

According to a further preferred implementation form of the first aspect, at least one, preferably each, of the signal paths additionally comprises a second filter arranged between the frequency shifting device and an output of the signal path, adapted to remove signal components outside of the bandwidth of the MIMO signal. This allows for an especially simple filtering to remove undesired signal components.

According to a further preferred implementation form of the first aspect, the frequency shifting devices are mixers. An especially simple and accurate frequency shifting is thereby possible.

According to a further preferred implementation form of the first aspect, the mixers are connected to a common reference frequency. A mixing to an identical frequency is thereby achieved.

According to a further preferred implementation form of the first aspect, the plurality of frequency shifted partial MIMO signals comprises N-frequency shifted partial MIMO signals. The signal divider is adapted to divide the first signal generator output signal onto N-signal paths. The MIMO signal generator comprises a further signal generator, adapted to generate M-frequency shifted partial MIMO signals within a second signal generator output signal, the M-frequency shifted partial MIMO signals being arranged on the frequency axis in a non-overlapping manner. The signal divider is then adapted to divide the second signal generator output signal onto M-signal paths. By this measure, it is possible to generate an even higher number of partial MIMO signals. This is especially relevant, when the first signal generator does not have the necessary bandwidth to place all desired partial MIMO signals side by side within the first signal generator output signal.

According to a further preferred implementation form of the first aspect, the signal divider is arranged in a first housing, while the frequency shifter is arranged in a second housing. This gives great flexibility when generating the MIMO signal.

According to a second aspect of the invention, an apparatus comprising a MIMO signal generator especially according to the first aspect is provided. The apparatus is a mobile station or a basestation or a measuring device. This allows for very flexibly using the MIMO signal generator.

According to a third aspect of the invention, a measuring system comprising a MIMO signal generator especially according to the first aspect and a device under test is provided. The device under test comprises a MIMO signal receiver. The MIMO signal generator is adapted to provide the MIMO signal to the device under test. The device under test is adapted to receive the MIMO signal using the MIMO signal receiver. It is thereby possible to perform measurements on the device under test using MIMO signals.

According to a preferred implementation form of the third aspect, the MIMO signal receiver is adapted to receive different data streams of a same frequency using separate antennas. A test of a spatial multiplexing device under test is thereby possible.

According to a further preferred implementation form of the third aspect, the MIMO signal generator comprises an antenna for each signal path. The MIMO signal generator is adapted to transmit the MIMO signal to the device under test over the air using the antennas of the signal paths. A close to real-world measurement is thereby possible.

According to a further preferred implementation form of the third aspect, the measuring system comprises an anechoic measuring chamber. The device under test and at least the antennas of the signal paths are arranged within the anechoic chamber. It is thereby assured that no stray emissions can influence the measurement.

According to a fourth aspect of the invention, a method for generating a MIMO signal is provided. The method comprises generating a plurality of frequency shifted partial MIMO signals within a first signal generator output signal, the frequency shifted partial MIMO signals being arranged on the frequency axis in a non-overlapping manner, dividing the first signal generator output signal onto a plurality of signal paths, and shifting the frequencies of the plurality of frequency shifted partial MIMO signals to a joint carrier frequency, resulting in a plurality of partial MIMO signals, forming the MIMO signal.

BRIEF DESCRIPTION OF THE DRAWINGS

An exemplary embodiment of the invention is now further explained by way of example only with respect to the drawings, in which.

DETAILED DESCRIPTION OF THE PREFERRED EMBODIMENTS

Figure 1:
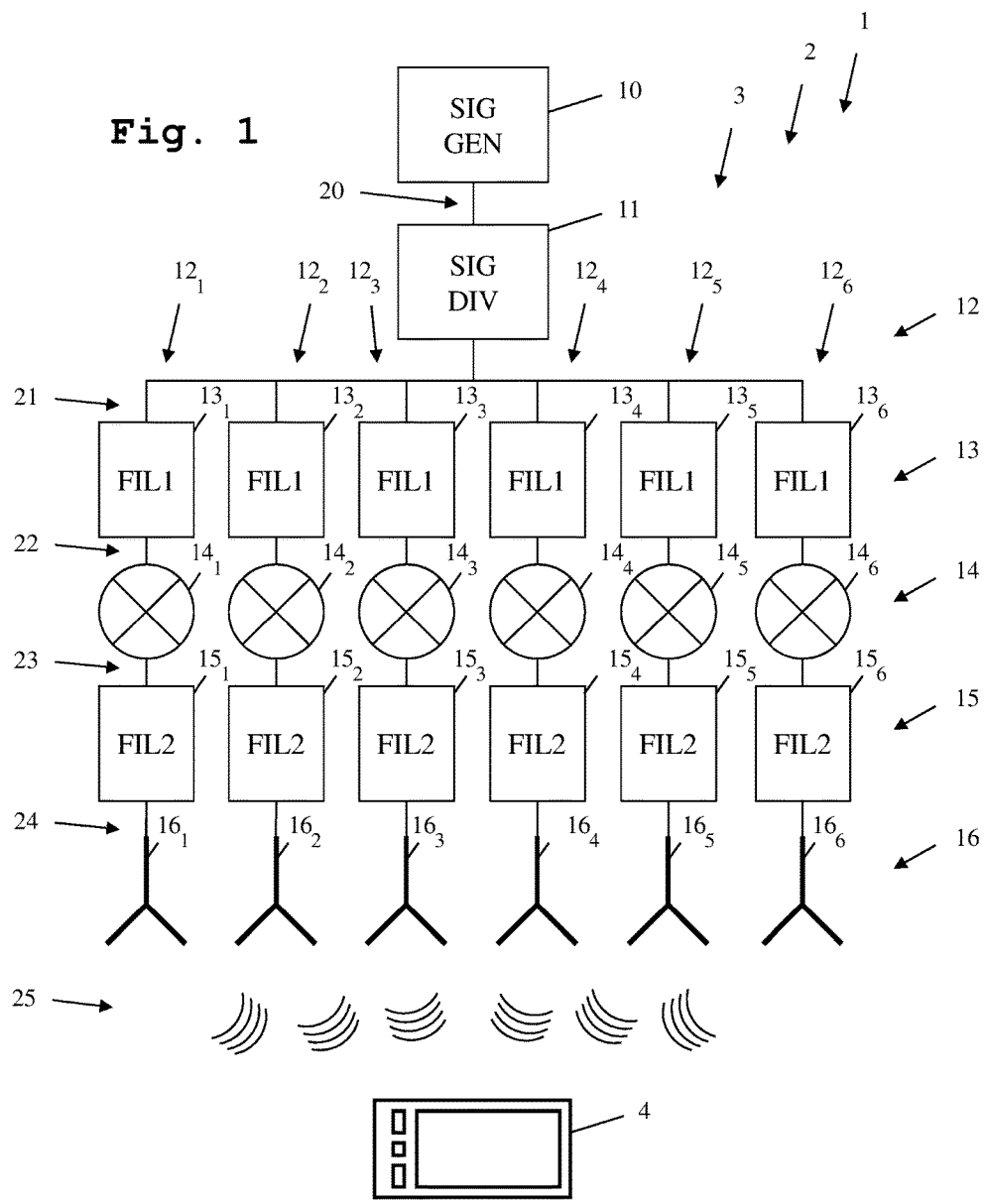
FIG. 1 shows a first embodiment of the measuring system according to the third aspect of the invention, a first embodiment of the apparatus according to the second aspect of the invention, and a MIMO signal generator according to the first aspect of the invention.

First we demonstrate the construction and function of an embodiment of the measuring system, apparatus and signal generator in FIG. 1. Along FIG. 2, an alternative embodiment of the signal generator is described. With regard to FIGS. 3-11, details of the function of different embodiments of the signal generator are described with regard to a number of signals. Along FIG. 12, finally, the function of an embodiment of the measuring method is shown. Similar entities and reference numbers in different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

First Embodiment

In FIG. 1, a measuring system 1, comprising a measuring device 2, comprising a MIMO signal generator 3 is shown. The MIMO signal generator 3 is adapted to transmit a MIMO signal 25 to a device under test 4. The MIMO signal generator 3 comprises a signal generator 10 connected to a signal divider 11, which is connected to a number of signal paths $12_1$, $12_2$, $12_3$, $12_4$, $12_5$, $12_6$, also referred to as plurality of signal paths 12. Each signal path comprises a first filter $13_1$, $13_2$, $13_3$, $13_4$, $13_5$, $13_6$, generally referred to as first filter 13. The filter paths 12 moreover each comprise a mixer $14_1$, $14_2$, $14_3$, $14_4$, $14_5$, $14_6$, generally referred to as mixer 14. Moreover, each filter path 12 comprises a second filter $15_1$, $15_2$, $15_3$, $15_4$, $15_5$, $15_6$, generally referred to as filter 15, and an antenna $16_1$, $16_2$, $16_3$, $16_4$, $16_5$, $16_6$, generally referred to as antenna 16.

Figure 4:
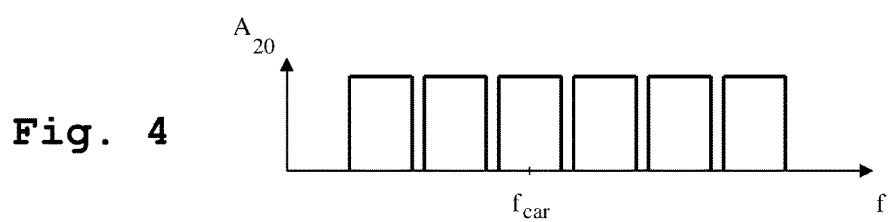
FIG. 4 shows an exemplary signal generator output signal of the MIMO signal generator according to the first aspect of the invention.

The signal generator 10 generates a signal generator output signal 20, which is for example depicted in FIG. 4. The signal generator output signal 20 comprises a plurality of frequency shifted partial MIMO signals. These are arranged on the frequency axis in a non-overlapping manner. Each of the frequency shifted partial MIMO signals has an identical bandwidth, but does not need to comprise the same data content. This does not exclude the frequency shifted partial MIMO signals comprising the same data content, though.

The frequency shifted partial MIMO signals are spaced apart so that they do not overlap, by spacing the center frequencies of the frequency shifted partial MIMO signals apart by at least the bandwidth a single frequency shifted partial MIMO signal. In order to make the spacing even more secure, an additional spacing of 10% or 20% can be used.

The signal generator output signal 20 is handed to a signal divider 11, which divides the signal generator output signal 20 onto a plurality of signal paths 12. Each signal path 12 receives the identical signal 21, which is in essence identical to the signal generator output signal 20. Within each of the filter paths 12, first, a filtering by a first filter 13 is performed. This filtering removes signal components outside of the bandwidth of the respective frequency shifted partial MIMO signal. As a next step, a mixing by the respective mixer 14 of the signal path 12 is performed. The filtered frequency shifted partial MIMO signal 22 of the respective signal path 12 is mixed with a local oscillator frequency, which is specific to the respective mixer. The local oscillator signal of the respective mixer is chosen so that the filtered frequency shifted partial MIMO signal 22 of each filter path 12 is mixed to an identical carrier frequency of the resulting MIMO signal 25. This is achieved by frequency shifting the local oscillator signal of each mixer, accordingly.

Resulting mixed partial MIMO signals 23 of the respective signal paths 12 are handed to second filters 15, which perform an additional filtering. In this filtering, signal components outside of the bandwidth of the MIMO signal 25 are removed. Here, each filter operates on the exact same frequency.

Finally, resulting filtered partial MIMO signals 24 are transmitted by the antennas 16 to the device under test 4. The signals during transmission are referred to as MIMO signal 25.

It is important to note that the first filters 13, the second filters 15 and the antennas 16 are optional components. Instead of using antennas 16, the partial MIMO signals 24 can also be provided to a device under test for example by cables.

Also it is important to note that the MIMO signal generator 3 is not to be understood as restricted to the application in a measuring device 2 or a measuring system 1, as depicted here. Also, a mobile device or a basestation might generate a MIMO signal by use of a MIMO signal generator 3, as depicted here.

Second Embodiment

Figure 2:
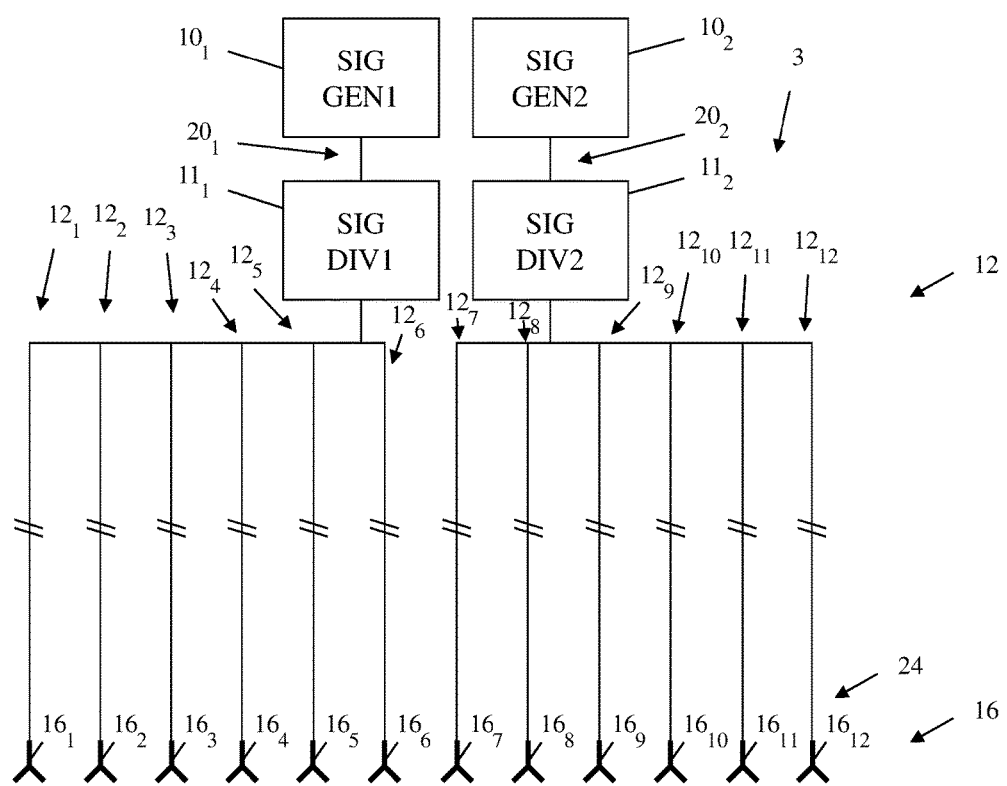
FIG. 2 shows a second embodiment of the MIMO signal generator according to the first aspect of the invention.

In FIG. 2, an alternative embodiment of the MIMO signal generator 3 is shown. Here, the MIMO signal generator 3 comprises a first signal generator $10_1$ connected to a first signal divider $11_1$, and a second signal generator $10_2$ connected to a second signal divider $11_2$. The first signal generator $10_1$ and the first signal divider $11_1$ are identical to the signal generator 10 and the signal divider 11 of FIG. 1. Also the further signal processing is identical, as shown there. The individual components of the signal paths 12 have not been displayed for reasons of clarity, here. In fact, the set-up though is identical to the set-up of FIG. 1.

Here, the second signal generator $10_2$ also generates a signal generator output signal $20_2$, which is handed to the second signal divider $11_2$ and divided onto the different signal paths $12_7$, $12_8$, $12_9$, $12_{10}$, $12_{11}$ and $12_{12}$. It is thereby possible to generate a larger number of individual partial MIMO signals 24, which may then be transmitted by use of the antennas $16_1$-$16_{12}$.

This is especially relevant, when the bandwidth of the signal generator 10 of FIG. 1 does not suffice to place all necessary partial MIMO signals side by side in the frequency domain within the signal generator output signal 20, due to the large bandwidth and number of partial MIMO signals. Also this approach is not limited to a second signal generator and signal divider. Also a larger number of individual signal generators and dividers can be used.

Figure 3:
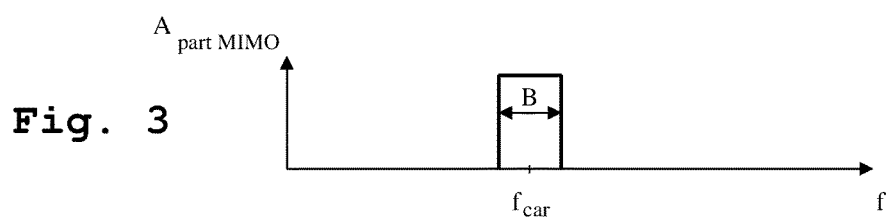
FIG. 3 shows an exemplary partial MIMO signal.

In FIG. 3, a first exemplary partial MIMO signal is shown. It can clearly be seen here that the partial MIMO signal has a carrier frequency and a bandwidth.

In FIG. 4, a signal generator output signal 20, as shown in FIG. 1 is depicted. Here, one of the partial MIMO signals is not frequency shifted, but remains in the correct frequency location. The remaining partial MIMO signals are frequency shifted with a gap of ten percent of the bandwidth of a partial MIMO signal. Therefore, all six partial MIMO signals are present in the signal generator output signal 20, but are frequency shifted.

FIG. 5-FIG. 10 show the individual frequency shifted partial MIMO signals individually. Especially, here the signals $22_1$, $22_2$, $22_3$, $22_4$, $22_5$ and $22_6$ of FIG. 1 are shown. The individual signals 22 no longer comprise the frequency shifted partial MIMO signals of the other measuring paths 12, since they have been filtered by the first filters 13.

Figure 11:
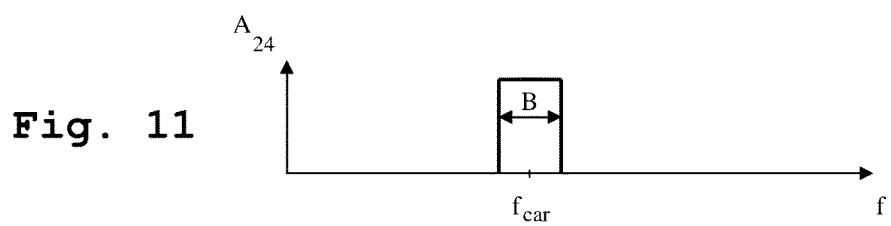
FIG. 11 shows a resulting partial MIMO signal in an exemplary MIMO signal generator of the first aspect of the invention.
Figures 5, 6, 7, 8, 9, 10:
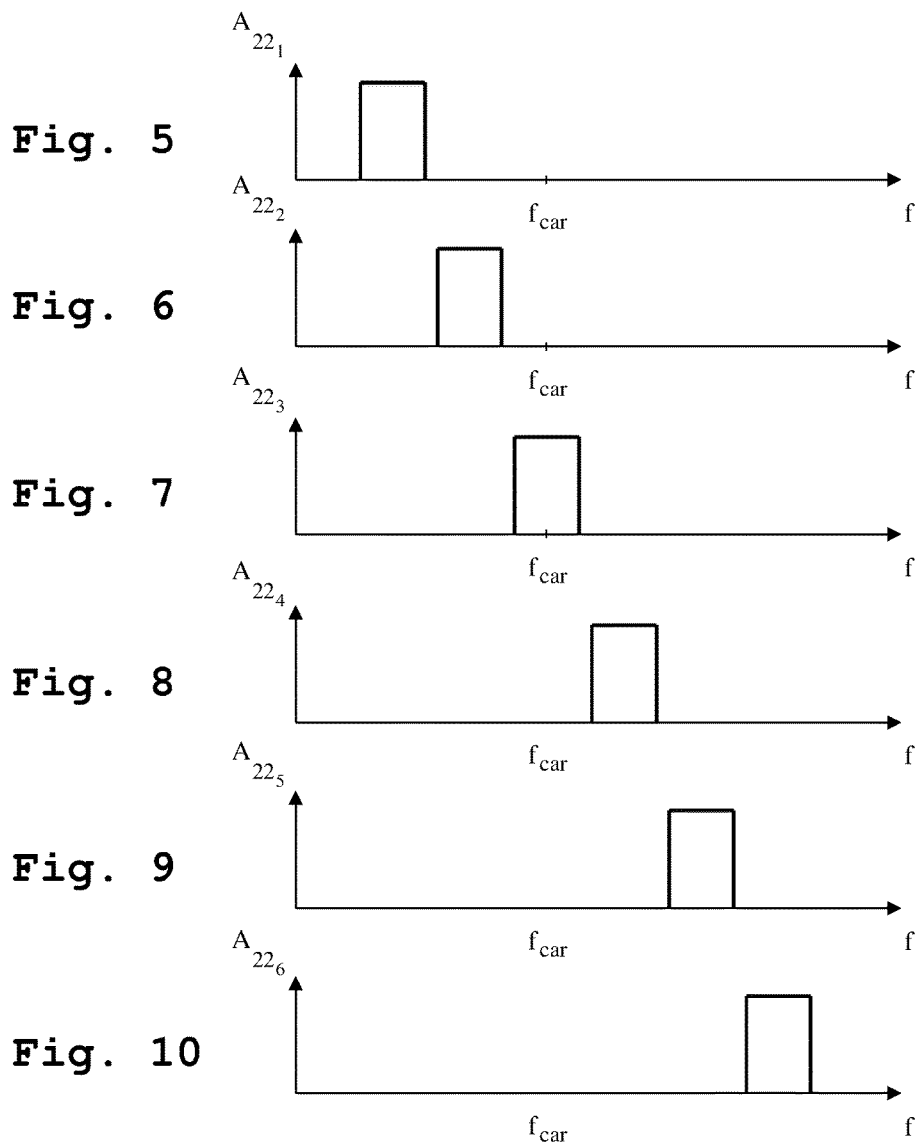
FIG. 5 shows a frequency shifted partial MIMO signal in an exemplary MIMO signal generator of the first aspect of the invention.
FIG. 6 shows a frequency shifted partial MIMO signal in an exemplary MIMO signal generator of the first aspect of the invention.
FIG. 7 shows a frequency shifted partial MIMO signal in an exemplary MIMO signal generator of the first aspect of the invention.
FIG. 8 shows a frequency shifted partial MIMO signal in an exemplary MIMO signal generator of the first aspect of the invention.
FIG. 9 shows a frequency shifted partial MIMO signal in an exemplary MIMO signal generator of the first aspect of the invention.
FIG. 10 shows a frequency shifted partial MIMO signal in an exemplary MIMO signal generator of the first aspect of the invention.

Finally, in FIG. 11, a resulting partial MIMO signal 24 as indicated in FIG. 1 is shown. It has the correct carrier frequency and bandwidth. All different partial MIMO signals $24_1$-$24_6$ seem identical in the frequency domain but might contain different data content.

Third Embodiment

Figure 12:
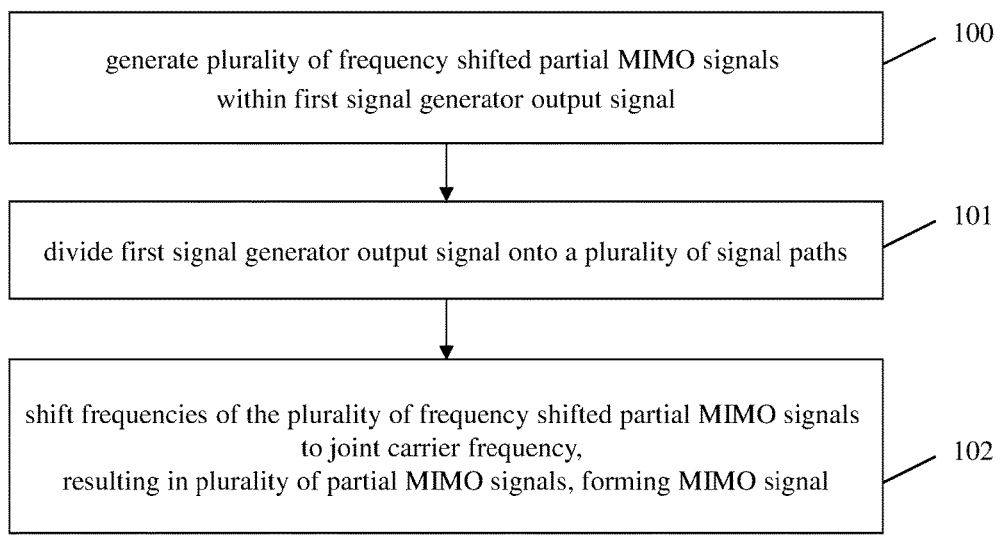
FIG. 12 shows an embodiment of the measuring method according to the fourth aspect of the invention.

Finally, in FIG. 12 an embodiment of the measuring method according to the fourth aspect of the invention is shown. In a first step 100 a plurality of frequency shifted partial MIMO signals is generated within a first signal generator output signal. These signals are frequency shifted, so that they do not overlap. Advantageously, a gap of ten or twenty percent of the bandwidth of a single partial MIMO signal might be employed between the frequency shifted partial MIMO signals in order to ensure that no overlap can occur.

In a second step 101 the first signal generator output signal is divided onto a plurality of signal paths.

In a third step 102 the frequency of each of the plurality of frequency shifted partial MIMO signals is shifted to a joint carrier frequency of the final MIMO signal. This results in a plurality of partial MIMO signals, forming the final MIMO signal.

It is important to note, that the method embodiment and the device embodiments very closely relate to each other and that features described along FIG. 1-FIG. 11 can also be employed the method shown in FIG. 12.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to a MIMO signal generator within a measuring device. The MIMO signal generator can also be employed in a base station or a mobile station or any other device generating memo signals. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

What is claimed is:

1. A MIMO signal generator, adapted to generate a MIMO signal, comprising:
   a signal generator, a signal divider, and a frequency shifter,
   wherein the signal generator is adapted to generate a plurality of frequency shifted partial MIMO signals within a first signal generator output signal, the plurality of frequency shifted partial MIMO signals being arranged on a frequency axis in a non-overlapping manner,
   wherein the signal divider is adapted to divide the first signal generator output signal onto a plurality of signal paths,
   wherein the frequency shifter is adapted to shift frequencies of the plurality of frequency shifted partial MIMO signals to a joint carrier frequency, resulting in a plurality of partial MIMO signals, forming the MIMO signal, and
   wherein the signal generator is adapted arrange the plurality of frequency shifted partial MIMO signals on the frequency axis in the non-overlapping manner, by placing a carrier frequency of all but one of the plurality of frequency shifted partial MIMO signals to different frequencies.

2. The MIMO signal generator of claim 1,
   wherein the frequency shifter comprises a frequency shifting device in at least one of the plurality of signals paths.

3. The MIMO signal generator of claim 1,
   wherein the different frequencies are spaced apart at least by a bandwidth of the MIMO signal, or
   wherein the different frequencies are spaced apart at least by 110% of a bandwidth of the MIMO signal by 120% of the bandwidth of the MIMO signal.

4. The MIMO signal generator of claim 1,
   wherein each signal path additionally comprises an antenna for transmitting a partial MIMO signal over the air.

5. The MIMO signal generator of claim 1,
   wherein at least one signal path additionally comprises a first filter arranged between the signal divider and the frequency shifting device, adapted to remove signals outside of a frequency shifted bandwidth of the at least one signal path.

6. The MIMO signal generator of claim 5,
   wherein at least one signal path additionally comprises a second filter arranged between the frequency shifting device and an output of the at least one signal path, adapted to remove signals outside of the bandwidth of the MIMO signal.

7. The MIMO signal generator of claim 1,
   wherein the frequency shifting device is a mixer.

8. The MIMO signal generator of claim 7,
   wherein the mixers are connected to common reference frequency means.

9. The MIMO signal generator of claim 1,
   wherein the plurality of frequency shifted partial MIMO signals comprises N frequency shifted partial MIMO signals,
   wherein the signal divider is adapted to divide the first signal generator output signal onto N signal paths,
   wherein the MIMO signal generator comprises a further signal generator, adapted to generate M frequency shifted partial MIMO signals within a second signal generator output signal, the M frequency shifted partial MIMO signals being arranged on the frequency axis in the non-overlapping manner,
   wherein the signal divider is adapted to divide the second signal generator output signal in M signal paths.

10. The MIMO signal generator of claim 1,
    wherein the signal divider is arranged in a first housing, and
    wherein the frequency shifter is arranged in a second housing.

11. An apparatus comprising a MIMO signal generator according to claim 1,
    wherein the apparatus is a mobile station or a basestation or measuring device.

12. A measuring system, comprising a MIMO signal generator according to claim 1, and a device under test,
    wherein the device under test comprises a MIMO signal receiver,
    wherein the MIMO signal generator is adapted to provide the MIMO signal to the device under test, and
    wherein the device under test is adapted to receive the MIMO signal using the MIMO signal receiver.

13. The measuring system of claim 12,
    wherein the MIMO signal receiver is adapted to receive different data streams of a same frequency using separate antennas.

14. The measuring system of claim 12,
    wherein the MIMO signal generator comprises an antenna for each signal path, and
    wherein the MIMO signal generator is adapted to transmit the MIMO signal to the device under test over the air using the antennas of the signal paths.

15. The measuring system of claim 13,
    wherein the measuring system comprises an anechoic measuring chamber, and
    wherein the device under test and at least the antennas of the signals paths are arranged within the anechoic measuring chamber.

16. A method for generating a MIMO signal, comprising:
    generating a plurality of frequency shifted partial MIMO signals within a first signal generator output signal, the plurality of frequency shifted partial MIMO signals being arranged on a frequency axis in a non-overlapping manner,
    dividing the first signal generator output signal onto a plurality of signal paths,
    shifting the frequencies of the plurality of frequency shifted partial MIMO signals to a joint carrier frequency, resulting in a plurality of partial MIMO signals, forming the MIMO signal,
    wherein the plurality of frequency shifted partial MIMO signals are arranged on the frequency axis in the non-overlapping manner, by placing a carrier frequency of all but one of the plurality of frequency shifted partial MIMO signals to different frequencies.

* * * * *